United States Patent
Miwa

(10) Patent No.: US 9,694,855 B2
(45) Date of Patent: Jul. 4, 2017

(54) VEHICLE REAR PORTION STRUCTURE WITH INLET PIPE

(71) Applicant: TOYOTA JIDOSHA KABUSHIKI KAISHA, Toyota-shi, Aichi (JP)

(72) Inventor: Masaki Miwa, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/655,921

(22) PCT Filed: Jun. 25, 2014

(86) PCT No.: PCT/JP2014/067604
§ 371 (c)(1),
(2) Date: Jun. 26, 2015

(87) PCT Pub. No.: WO2015/015990
PCT Pub. Date: Feb. 5, 2015

(65) Prior Publication Data
US 2015/0360727 A1    Dec. 17, 2015

(30) Foreign Application Priority Data

Aug. 1, 2013   (JP) ................................. 2013-160639

(51) Int. Cl.
*B62D 25/08*   (2006.01)
*B60K 15/01*   (2006.01)
(Continued)

(52) U.S. Cl.
CPC ........... *B62D 25/088* (2013.01); *B60G 13/00* (2013.01); *B60K 15/01* (2013.01); *B60K 15/04* (2013.01);
(Continued)

(58) Field of Classification Search
CPC .... B62D 25/088; B62D 25/087; B60G 13/00; B60K 15/01; B60K 15/04; B60K 2015/0474
(Continued)

(56) References Cited

U.S. PATENT DOCUMENTS 4,746,146 A    5/1988   Hirabayashi et al.
7,040,432 B2*  5/2006   Kawasaki .............. B60K 15/01
                                                     180/65.1
(Continued)

FOREIGN PATENT DOCUMENTS

JP    S57-67178 U   10/1980
JP    S58-76326 A   5/1983
(Continued)

*Primary Examiner* — Karen Beck
(74) *Attorney, Agent, or Firm* — Andrews Kurth Kenyon LLP

(57) ABSTRACT

A vehicle rear portion structure has: a suspension structural portion that overlaps a rear side member as seen in a vehicle plan view; an inlet pipe that passes-through between the rear side member and the suspension structural portion; and a pipe protecting portion that is provided at a position overlapping the rear side member and the suspension structural portion in a vehicle plan view, and a length in a vehicle vertical direction of the pipe protecting portion is set to be longer than an outer diameter of the inlet pipe, and rigidity, with respect to load from a vehicle lower side, of the pipe protecting portion is set to be higher than that of the inlet pipe.

5 Claims, 10 Drawing Sheets

(51) Int. Cl.
*B60K 15/04* (2006.01)
*B60G 13/00* (2006.01)

(52) U.S. Cl.
CPC .... *B60K 2015/0474* (2013.01); *B62D 25/087* (2013.01)

(58) Field of Classification Search
USPC .................................................. 280/124.109
See application file for complete search history.

(56) References Cited

U.S. PATENT DOCUMENTS

| | | | | |
|---|---|---|---|---|
| 7,770,679 | B2 * | 8/2010 | Takaku | B60K 1/04 180/68.5 |
| 7,784,823 | B2 * | 8/2010 | Heigl | B60R 21/213 280/730.2 |
| 2015/0108792 | A1 * | 4/2015 | Mildner | B60K 15/05 296/198 |
| 2015/0158530 | A1 * | 6/2015 | Mikami | B62D 21/11 280/782 |
| 2015/0360727 | A1 * | 12/2015 | Miwa | B60K 15/01 280/124.109 |
| 2016/0159400 | A1 * | 6/2016 | Matsuoka | B62D 21/152 296/187.11 |

FOREIGN PATENT DOCUMENTS

| | | |
|---|---|---|
| JP | H01-93179 U | 6/1989 |
| JP | H06-286484 A | 10/1994 |
| JP | 2007-91056 A | 4/2007 |
| JP | 3902357 B2 | 4/2007 |
| JP | 2009-241914 A | 10/2009 |
| JP | 4433587 B2 | 3/2010 |

* cited by examiner

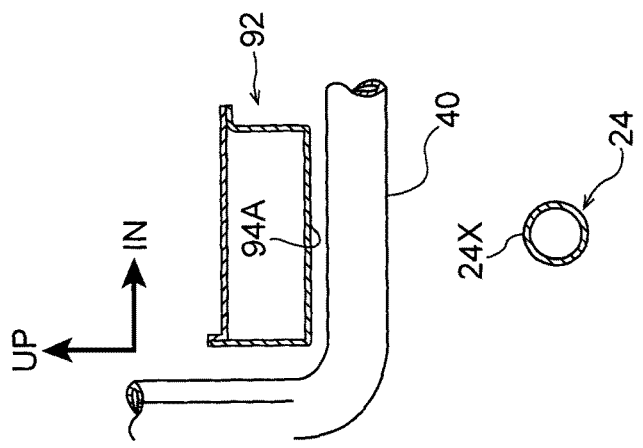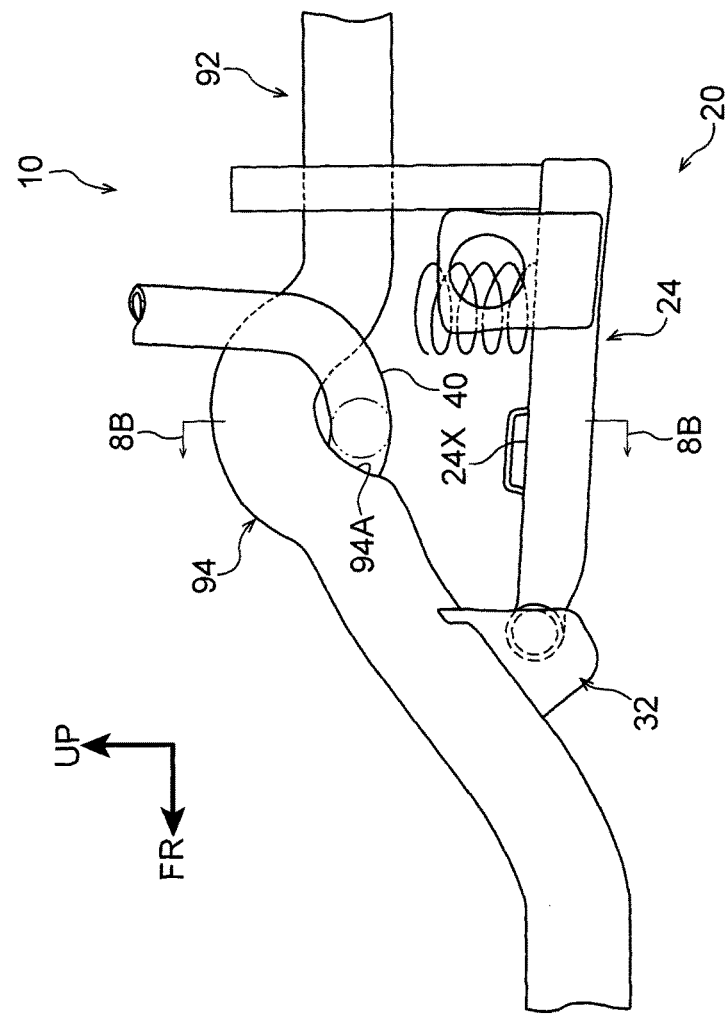

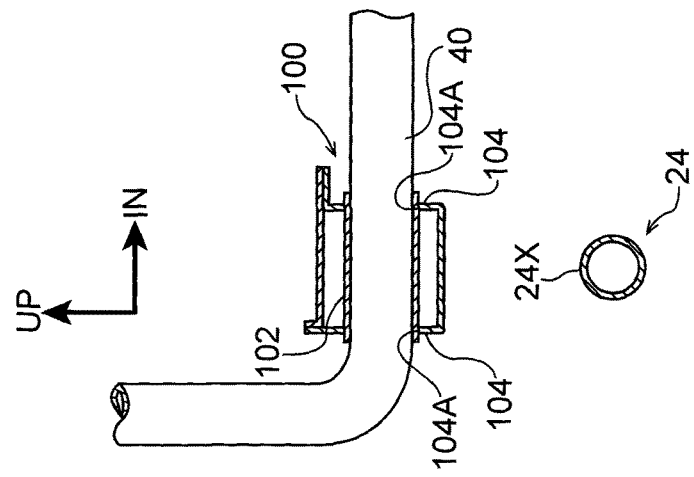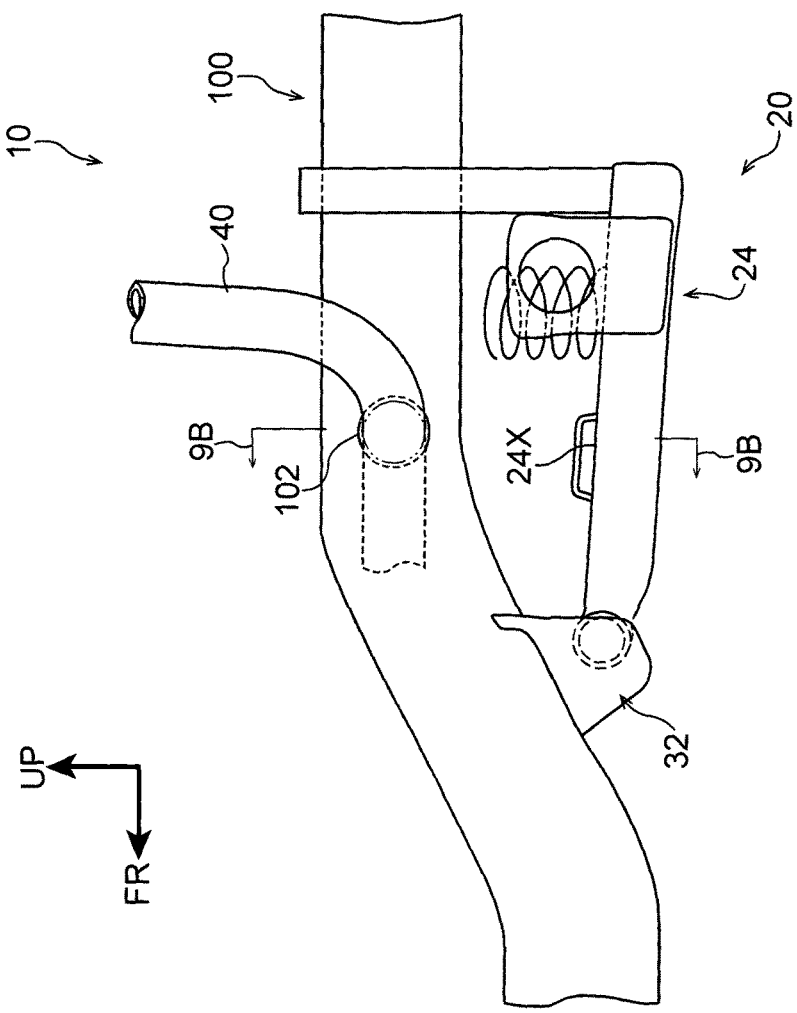

VEHICLE REAR PORTION STRUCTURE WITH INLET PIPE

CROSS-REFERENCE TO RELATED APPLICATIONS

This is a national phase application based on the PCT International Patent Application No. PCT/JP2014/067604 filed Jun. 25, 2014, claiming priority to Japanese Patent Application No. 2013-160639 filed Aug. 1, 2013, the entire contents of both of which are incorporated herein by reference.

TECHNICAL FIELD

The present invention relates to a vehicle rear portion structure.

BACKGROUND ART

Structures in which a fuel tank is installed in a vehicle and an inlet pipe is connected to the fuel tank are known (see, for example, Japanese Patent No. 4433587, Japanese Patent Application Laid-Open (JP-A) No. S58-76326, Japanese Patent No. 3902357, Japanese Utility Model Application Laid-Open No. H1-93179). In such a structure, there are cases in which the inlet pipe passes-through between a rear side member and a suspension structural portion that overlap in the vehicle vertical direction (see, for example, Japanese Patent No. 4433587).

SUMMARY OF INVENTION

Technical Problem

However, in such a structure, there is room for improvement from the standpoint of suppressing input of load to the inlet pipe in cases in which the suspension structural portion is displaced toward the vehicle upper side.

In consideration of the above-described circumstances, an object of the present invention is to obtain a vehicle rear portion structure that can suppress input of load to an inlet pipe even in cases in which a suspension structural portion is displaced toward the vehicle upper side.

Solution to Problem

A vehicle rear portion structure relating to a first aspect of the present invention has: a rear side member that is disposed at a side of a vehicle rear portion, with a vehicle longitudinal direction being a length direction; a suspension structural portion that constitutes a portion of a rear suspension, and that is disposed at a vehicle lower side of the rear side member with a gap therebetween, and that overlaps the rear side member as seen in a vehicle plan view; an inlet pipe that passes between the rear side member and the suspension structural portion; and a pipe protecting portion that is provided at a position overlapping the rear side member and the suspension structural portion as seen in a vehicle plan view, and that includes a region adjacent to a side of the inlet pipe, wherein a length in a vehicle vertical direction of the pipe protecting portion is set to be longer than an outer diameter of the inlet pipe, and wherein a rigidity, with respect to a load from the vehicle lower side, of the pipe protecting portion is set to be greater than that of the inlet pipe.

In accordance with the above-described structure, the rear side member is disposed at the side of the vehicle rear portion with the vehicle longitudinal direction being the length directions thereof. In contrast, the suspension structural portion that constitutes a portion of the rear suspension is disposed at the vehicle lower side of the rear side member with a gap therebetween, and overlaps the rear side member as seen in a vehicle plan view. Further, the inlet pipe passes between the rear side member and the suspension structural portion, and the pipe protecting portion is provided at a position overlapping the rear side member and the suspension structural portion as seen in a vehicle plan view. This pipe protecting portion is structured to include a region that is adjacent to a side of the inlet pipe. Therefore, even if the suspension structural portion is displaced toward the vehicle upper side, the gap between the bottom surface of the rear side member and the top surface of the suspension structural portion, that are disposed above and below the inlet pipe, is ensured by the pipe protecting portion.

Here, the length, in the vehicle vertical direction, of the pipe protecting portion is set to be greater than the outer diameter of the inlet pipe, and the rigidity, with respect to load from the vehicle lower side, of the pipe protecting portion is set to be greater than that of the inlet pipe. Therefore, even if the suspension structural portion is displaced toward the vehicle upper side as described above, when the pipe protecting portion does not deform (or hardly deforms at all), the gap between the bottom surface of the rear side member and the top surface of the suspension structural portion, that are disposed above and below the inlet pipe, is maintained longer than the outer diameter of the inlet pipe. Accordingly, input of load to the inlet pipe is suppressed.

In a vehicle rear portion structure relating to a second aspect of the present invention, in the vehicle rear portion structure relating to the first aspect, the pipe protecting portion has a bracket that is disposed between the rear side member and the suspension structural portion, and that is fixed to one of the rear side member or the suspension structural portion, and that, together with the one to which the bracket is fixed, structures a closed cross-section portion.

In accordance with the above-described structure, the pipe protecting portion has a bracket. This bracket is disposed between the rear side member and the suspension structural portion, and is fixed to one of the rear side member or the suspension structural portion. Further, the bracket, together with the one to which the bracket is fixed, structures a closed cross-section portion. Therefore, in a case in which the suspension structural portion is displaced toward the vehicle upper side, even if the bracket and the other of the rear side member or the suspension structural portion collide, deformation in the vehicle vertical direction of the bracket is suppressed effectively.

In a vehicle rear portion structure relating to a third aspect of the present invention, in the vehicle rear portion structure relating to the first aspect or the second aspect, the pipe protecting portion has a bracket that is disposed between the rear side member and the suspension structural portion, and that is fixed to one of the rear side member or the suspension structural portion, and a covering portion, that covers the inlet pipe from a side of other of the rear side member or the suspension structural portion, is formed at the bracket. Note that, in the structure that cites the second aspect, the bracket of the second aspect and the bracket of the third aspect are the same bracket.

In accordance with the above-described structure, the pipe protecting portion has a bracket. This bracket is disposed between the rear side member and the suspension structural portion, and is fixed to one of the rear side member or the suspension structural portion. Further, a covering portion, that covers the inlet pipe from the side of the other of the rear side member or the suspension structural portion, is formed at the bracket. Therefore, even if the suspension structural portion is displaced toward the vehicle upper side, direct collision of the inlet pipe and the other is avoided by the covering portion.

In a vehicle rear portion structure relating to a fourth aspect of the present invention, in the vehicle rear portion structure relating to the second aspect, the inlet pipe is inserted-through an interior of a hollow portion of the closed cross-section portion.

In accordance with the above-described structure, the inlet pipe is inserted-through the interior of the hollow portion of the closed cross-section portion. Therefore, direct collision with the inlet pipe is avoided over the entire periphery.

In a vehicle rear portion structure relating to a fifth aspect of the present invention, in the vehicle rear portion structure relating to any one of the second aspect through the fourth aspect, the bracket is fixed to the rear side member, and a convex portion, that is bent toward a vehicle lower side, is formed at a vehicle lower side end portion of the bracket.

In accordance with the above-described structure, the bracket is fixed to the rear side member, and a convex portion that is bent toward the vehicle lower side is formed at the vehicle lower side end portion of the bracket. Therefore, for example, in a case in which the suspension structural portion is displaced toward the vehicle upper side in a state in which foreign matter has collected on the top surface of the suspension structural portion, the foreign matter hits and is broken by the convex portion. Due to the foreign matter being broken in this way, the frequency of input of load to the bracket is reduced.

In a vehicle rear portion structure relating to a sixth aspect of the present invention, in the vehicle rear portion structure relating to any one of the second aspect through the fifth aspect, a bent portion, that is bent toward a vehicle obliquely lower front side, is formed at an intermediate portion in the vehicle longitudinal direction of the rear side member, and both end portions in the vehicle longitudinal direction of the bracket straddle the bent portion and are fixed to the rear side member.

In accordance with the above-described structure, a bent portion, that is bent toward a vehicle obliquely lower front side, is formed at the intermediate portion in the vehicle longitudinal direction of the rear side member. Therefore, at the time of a rear collision of the vehicle, it is easy for the rear side member to deform with the bent portion being the fulcrum. However, the bent portion is reinforced because the both end portions in the vehicle longitudinal direction of the bracket straddle the bent portion and are fixed to the rear side member.

Advantageous Effects of Invention

As described above, in accordance with the vehicle rear portion structure relating to the first aspect of the present invention, there is the excellent effect that, even in a case in which a suspension structural portion is displaced toward a vehicle upper side, input of load to an inlet pipe can be suppressed.

In accordance with the vehicle rear portion structure relating to the second aspect, there is the excellent effect that, even if a suspension structural portion is displaced toward a vehicle upper side, a gap between the bottom surface of a rear side member and the top surface of the suspension structural portion can be ensured stably.

In accordance with the vehicle rear portion structure relating to the third aspect, there is the excellent effect that, even if a suspension structural portion is displaced toward a vehicle upper side, direct input to an inlet pipe can be avoided.

In accordance with the vehicle rear portion structure relating to the fourth aspect, there is the excellent effect that, even if a suspension structural portion is displaced toward a vehicle upper side, an inlet pipe can be protected more effectively.

In accordance with the vehicle rear portion structure relating to the fifth aspect, there is the excellent effect that, even in a case in which foreign matter collects on the top surface of a suspension structural portion, input of load to an inlet pipe can be suppressed effectively.

In accordance with the vehicle rear portion structure relating to the sixth aspect, there is the excellent effect that a bracket can be used also for reinforcing a bent portion of a rear side member.

BRIEF DESCRIPTION OF DRAWINGS

FIG. 8A is a side view showing a vehicle rear portion structure relating to a third embodiment of the present invention.

FIG. 8B is a sectional view along line 8B-8B of FIG. 8A.

FIG. 9A is a side view showing a vehicle rear portion structure relating to a reference example.

FIG. 9B is a sectional view along line 9B-9B of FIG. 9A.

DESCRIPTION OF EMBODIMENTS

First Embodiment

Figure 1:
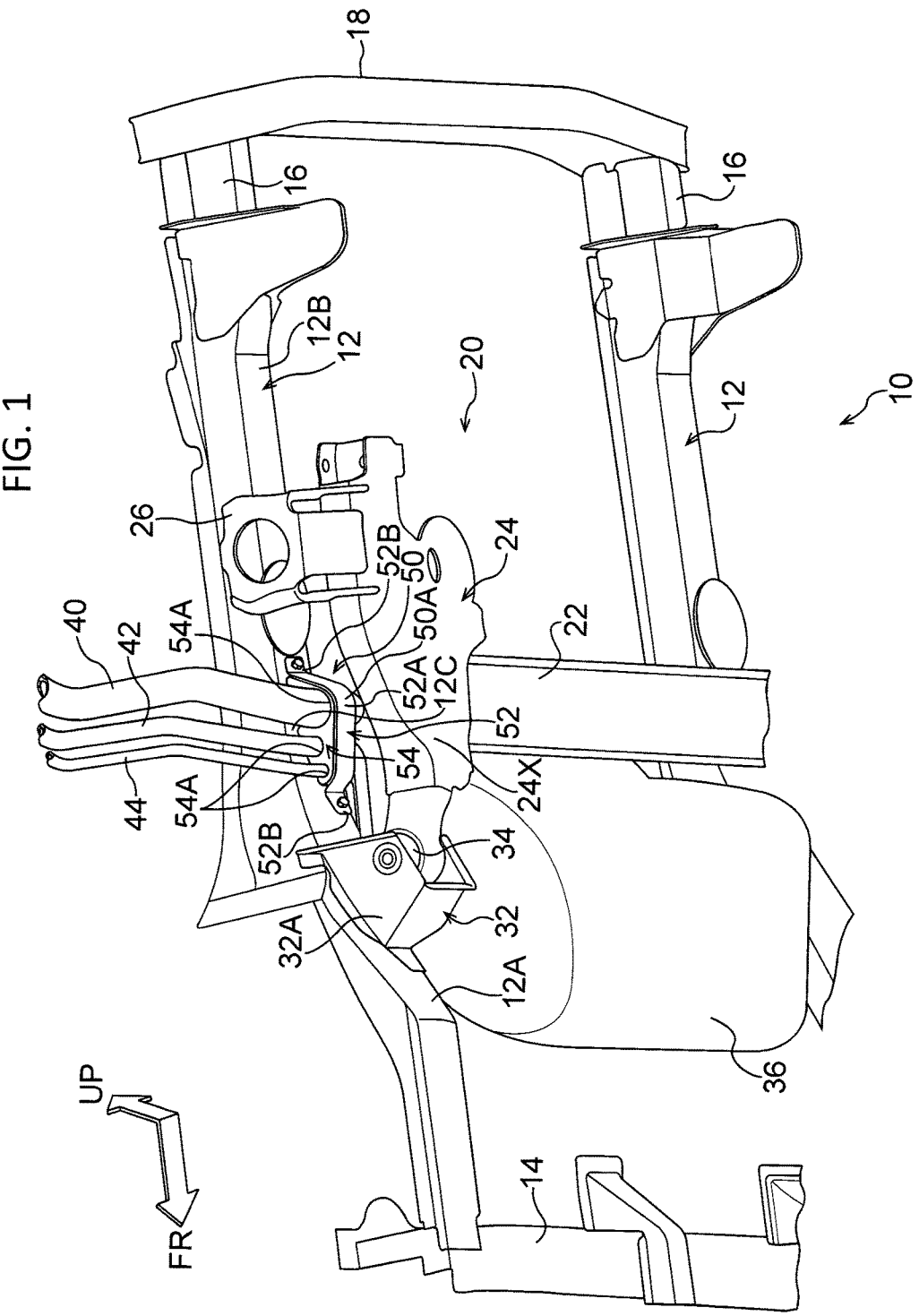
FIG. 1 is a perspective view showing a state in which a vehicle rear portion structure relating to a first embodiment of the present invention is viewed from a vehicle obliquely lower side.
Figure 3:
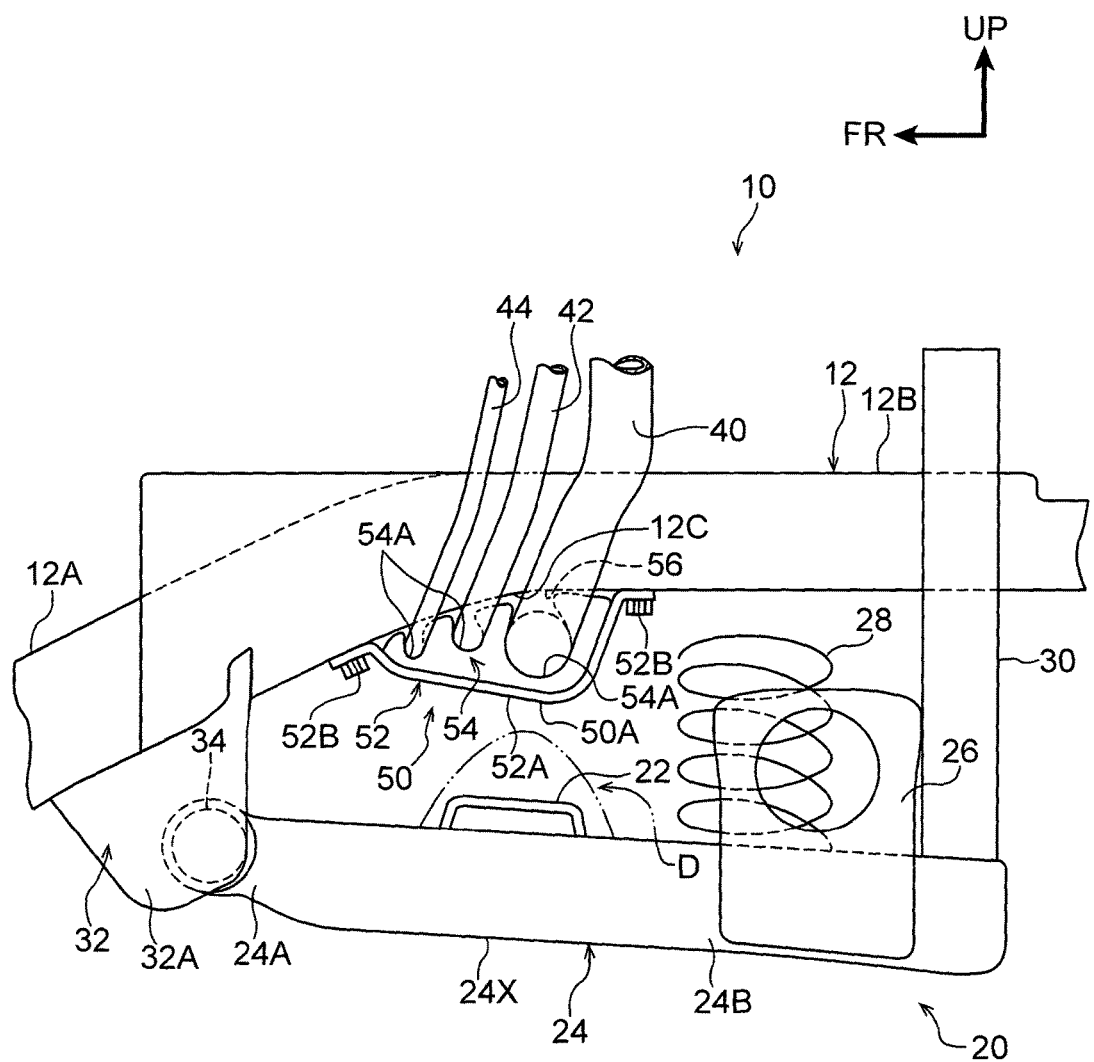
FIG. 3 is a side view showing the vehicle rear portion structure relating to the first embodiment of the present invention.

A vehicle rear portion structure relating to a first embodiment of the present invention is described by using FIG. 1 through FIG. 3. Note that arrow FR that is shown appropriately in these drawings indicates the vehicle front side, arrow UP indicates the vehicle upper side, and arrow IN indicates the vehicle transverse direction inner side.

Figure 2:
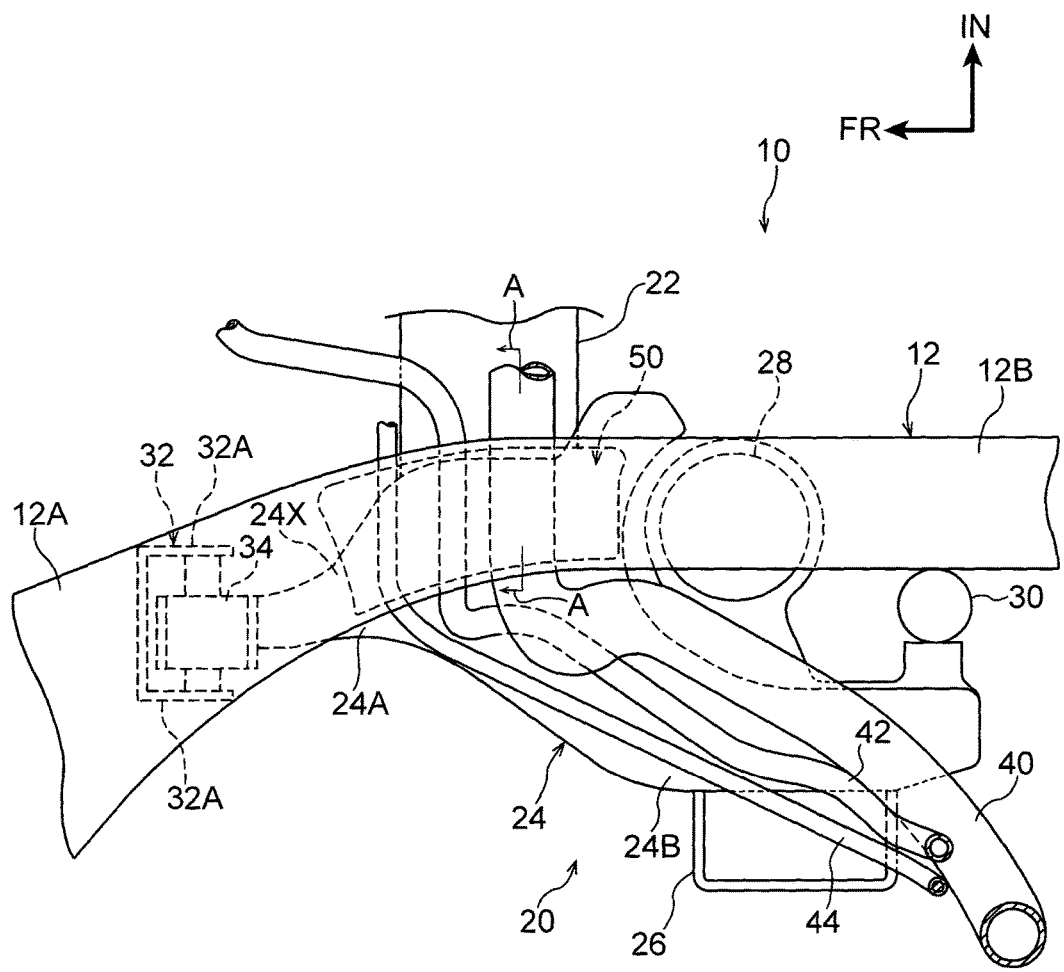
FIG. 2 is a plan view showing the vehicle rear portion structure relating to the first embodiment of the present invention.

The vehicle rear portion structure relating to the present embodiment is shown in FIG. 1 in a perspective view in a state of being viewed from a vehicle obliquely lower side. Further, the vehicle rear portion structure relating to the present embodiment is shown in FIG. 2 in a plan view of a vehicle rear portion left side, and the vehicle rear portion structure relating to the present embodiment is shown in FIG. 3 in a side view in a state of being viewed from a vehicle left side.

As shown in FIG. 1, a pair of left and right rear side members 12 that are elongated are disposed at the both sides of a vehicle rear portion 10 with the vehicle longitudinal direction being the length directions thereof. These rear side members 12 are disposed at the lower surface side of an unillustrated floor panel, and the cross-sectional shapes thereof, that are cut in the vehicle transverse direction, are formed in closed cross-sectional shapes. As shown in FIG. 2, the rear side member 12 is made to be a shape that circumvents an unillustrated rear wheel, and a rear portion 12B is positioned further toward the vehicle transverse direction inner side than a front portion 12A. Further, as shown in FIG. 3, a bent portion 12C, that is bent toward the vehicle obliquely lower front side, is formed at the intermediate portion in the vehicle longitudinal direction of the rear side member 12. Namely, the front portion 12A of the rear side member 12 is inclined at a downward slope as seen in a vehicle side view, and is disposed at a position that is lower than the rear portion 12B.

A rear cross member 14, whose length direction is the vehicle transverse direction, spans between the front end portions of the pair of left and right rear side members 12 that are shown in FIG. 1. The rear end portions of the pair of left and right rear side members 12 are connected to a rear bumper reinforcement 18 via crash boxes 16. The rear bumper reinforcement 18 is disposed at the vehicle rear end portion with the length direction thereof being the vehicle transverse direction.

Further, a rear suspension 20 (as an example, a torsion beam rear suspension) is disposed at a position that includes the lower sides of the vehicle longitudinal direction intermediate portions of the rear side members 12. The rear suspension 20 has an intermediate beam 22 that is disposed with the vehicle transverse direction being the length direction thereof. The intermediate beam 22 is a closed cross-sectional structure whose vehicle lower side is open. The vehicle longitudinal direction intermediate portions of trailing arms (suspension arms) 24 are joined to the both end portions in the length direction of the intermediate beam 22. Note that the trailing arms 24 also structure portions of the rear suspension 20.

As shown in FIG. 2, as seen in a vehicle plan view, a rear portion 24B side of the trailing arm 24 is positioned further toward the vehicle transverse direction outer side than a front portion 24A side. An overlap portion 24X, that serves as a suspension structural portion and that overlaps the rear side member 12 as seen in a vehicle plan view, is provided at the front portion 24A of the trailing arm 24. As shown in FIG. 1, the overlap portion 24X is disposed at the vehicle lower side of the rear side member 12 with a gap therebetween.

As shown in FIG. 2 and FIG. 3, a carrier 26, that supports an unillustrated rear wheel such that the rear wheel rotates freely, is mounted to the rear portion 24B of the trailing arm 24, and a coil spring 28 is disposed at the vehicle transverse direction inner side with respect to the carrier 26. The lower end portion of the coil spring 28 is mounted to the trailing arm 24 via an unillustrated lower spring seat, and the upper end portion of the coil spring 28 is mounted to the vehicle body via an unillustrated upper spring seat. Further, a shock absorber 30 is provided upright at the rear end portion of the trailing arm 24, at the vehicle rear side with respect to the coil spring 28. The lower end portion of the shock absorber 30 is mounted to the rear end portion of the trailing arm 24, and the upper end portion of the shock absorber 30 is mounted to the vehicle body.

A mounting bracket 32 is disposed at the front end portion side of the trailing arm 24. The mounting bracket 32 is fixed to the bottom surface side of the front portion 12A of the rear side member 12 (see FIG. 1), and has a pair of side wall portions 32A that are lined-up in the vehicle transverse direction. A bush 34, that is press-fit at the front end portion of the trailing arm 24, is disposed between the pair of side wall portions 32A of the mounting bracket 32. The bush 34 is axially supported at the pair of side wall portions 32A of the mounting bracket 32. Due thereto, the trailing arm 24 is made to be swingable.

Further, as shown in FIG. 1, a fuel tank 36 is disposed between the front portions 12A of the rear side members 12. Although detailed illustration thereof is omitted, the fuel tank 36 is disposed at the vehicle bottom surface side and is supported at the vehicle body side such as at the rear side member 12 or the like. The end portion, at the downstream side in a fuel supplying direction, of an inlet pipe 40 (a fuel inlet pipe), is connected to the fuel tank 36. In contrast, a fueling gun of an unillustrated fueling device is connected to the end portion, at the upstream side in the fuel supplying direction, of the inlet pipe 40. Due thereto, fuel that flows through the inlet pipe 40 is supplied to the fuel tank 36. The intermediate portion, in the fuel supplying direction, of the inlet pipe 40 passes-through between the rear side member 12 and the overlap portion 24X at the trailing arm 24.

Note that it is preferable that the inlet pipe 40 is, set further toward the vehicle front side than an energy absorbing section that is structured by the rear side members 12 and the like at the time of a rear collision of the vehicle (is mainly set further toward the vehicle front side than the shock absorbers 30). Further, it is preferable that the inlet pipe 40 be set further toward the vehicle rear side than the bush 34, in consideration of the ease of passengers entering and exiting the vehicle.

Further, one end portion of a breather pipe 42 is connected to the fuel tank 36. The other end portion of the breather pipe 42 is connected to the end portion, at the upstream side in the fuel supplying direction, of the inlet pipe 40. Further, one end portion of an air tube 44, that is provided parallel to the breather pipe 42, is connected to an unillustrated canister, and the other end portion of the air tube 44 is disposed adjacent to the end portion, at the upstream side in the fuel supplying direction, of the inlet pipe 40. In the same way as the inlet pipe 40, the intermediate portion of the breather pipe 42 and the intermediate portion of the air tube 44 also pass-through between the rear side member 12 and the overlap portion 24X at the trailing arm 24. Note that the outer diameter of the breather pipe 42 and the outer diameter of the air tube 44 are set to be smaller than the outer diameter of the inlet pipe 40.

As shown in FIG. 2, a bracket 50 that serves as a pipe protecting portion is provided at a position that overlaps the rear side member 12 and the overlap portion 24X at the trailing arm 24, as seen in a vehicle plan view. As shown in FIG. 1, the bracket 50 is disposed between the rear side member 12 and the overlap portion 24X at the trailing arm 24, and is structured to include a region that is adjacent to the side of the inlet pipe 40.

The bracket 50 is structured by a plate member 52, that is made of metal, and a holding member 54, that is made of resin, being adhered together. At the plate member 52, the intermediate portion in the vehicle longitudinal direction is made to be an L-shaped portion 52A is made to be an L-shaped portion 52A that is bent in an L-shape and in an arc shape so as to open toward the vehicle obliquely upper front side, and the both end portions in the vehicle longitudinal direction are made to be flange portions 52B. Further, the holding member 54 is disposed at the inner surface side of the L-shaped portion 52A of the plate member 52. A total of three concave portions 54A, that open toward the vehicle upper side and pass-through in the vehicle transverse direction, are formed in the holding member 54. The concave portions 54A are for holding the inlet pipe 40, the breather pipe 42 and the air tube 44, and have arc-shaped inner peripheral surfaces that contact the outer peripheral surfaces of the respective objects of holding.

As shown in FIG. 3, the flange portions 52B of the plate member 52 of the bracket 50 straddle the bent portion 12C of the rear side member 12 and are fastened and fixed by bolts to the bottom surface side of the rear side member 12. Further, the bracket 50, together with the rear side member 12, structures a closed cross-section portion 56, and a portion of the plate member 52 and a portion of the holding member 54 structure a covering portion 50A that covers the inlet pipe 40 from the vehicle lower side (the side of the overlap portion 24X of the trailing arm 24). Further, the inlet pipe 40, the breather pipe 42 and the air tube 44 are inserted through the interior of the hollow portion of the closed cross-section portion 56.

The length in the vehicle vertical direction of the bracket 50 is set to be longer than the outer diameter of the inlet pipe 40. Further, the rigidity, with respect to load from the vehicle lower side, of the bracket 50 is set to be higher than that of the inlet pipe 40.

(Operation/Effects)

The operation and effects of the above-described embodiment are described next.

In the present embodiment, as shown in FIG. 1, the inlet pipe 40 passes-through between the rear side member 12 and the overlap portion 24X of the trailing arm 24, and the bracket 50 is provided at a position overlapping the rear side member 12 and the overlap portion 24X at the trailing arm 24 as seen in a vehicle plan view. This bracket 50 is structured to include a region that is adjacent to the side of the inlet pipe 40. Therefore, even if the overlap portion 24X at the trailing arm 24 is displaced toward the vehicle upper side when the vehicle is traveling, the gap between the bottom surface of the rear side member 12 and the top surface the overlap portion 24X of the trailing arm 24, that are disposed above and below the inlet pipe 40, is ensured by the bracket 50.

Here, as shown in FIG. 3, the length in the vehicle vertical direction of the bracket 50 is set to be longer than the outer diameter of the inlet pipe 40, and the rigidity, with respect to load from the vehicle lower side, of the bracket 50 is set to be higher than that of the inlet pipe 40. Therefore, even if the overlap portion 24X at the trailing arm 24 is displaced toward the vehicle upper side as described above, when the bracket 50 does not deform (or hardly deforms at all), the gap between the bottom surface of the rear side member 12 and the top surface of the overlap portion 24X at the trailing arm 24, that are disposed above and below the inlet pipe 40, is maintained longer than the outer diameter of the inlet pipe 40. Accordingly, input of load to the inlet pipe 40 is suppressed.

Further, in a state in which foreign matter D (e.g., ice, stones, chips of wood, mud or the like) has adhered to or accumulated on the top surface of the trailing arm 24 when the vehicle travels, bounding of the trailing arm 24 also can be supposed. However, in this case as well, similarly, input of the load to the inlet pipe 40 is suppressed. Further, the inlet pipe 40 being nipped between the rear side member 12 and the foreign matter D can be prevented.

Further, in the present embodiment, the bracket 50 is disposed between the rear side member 12 and the overlap portion 24X at the trailing arm 24, and is fixed to the rear side member 12, and, together with the rear side member 12, structures the closed cross-section portion 56. Therefore, in a case in which the overlap portion 24X at the trailing arm 24 is displaced toward the vehicle upper side, even if the overlap portion 24X at the trailing arm 24 and the bracket 50 collide, deformation in the vehicle vertical direction of the bracket 50 is suppressed effectively.

Further, the covering portion 50A that covers the inlet pipe 40 from the lower side is formed at the bracket 50. Therefore, even if the overlap portion 24X at the trailing arm 24 is displaced toward the vehicle upper side, direct colliding of the inlet pipe 40 and the overlap portion 24X at the trailing arm 24 is avoided due to the covering portion 50A. Moreover, in the present embodiment, further, because the inlet pipe 40 is inserted-through the interior of the hollow portion of the closed cross-section portion 56, direct collision with the inlet pipe 40 is avoided over the entire periphery thereof.

As described above, in accordance with the vehicle rear portion structure relating to the present embodiment, even in a case in which the overlap portion 24X at the trailing arm 24 is displaced toward the vehicle upper side, input of load to the inlet pipe 40 can be suppressed.

Note that the bent portion 12C, that is bent toward the vehicle obliquely lower front side, is formed at the intermediate portion in the vehicle longitudinal direction of the rear side member 12, and therefore, at the time of a rear collision of the vehicle, it is easy for the rear side member 12 to deform with the bent portion 12C being the fulcrum. However, in the present embodiment, the flange portions 52B, that form the both end portions in the vehicle longitudinal direction of the bracket 50, straddle the bent portion 12C and are fixed to the rear side member 12, and therefore, the bent portion 12C is reinforced. Namely, the bracket 50 can be used also for reinforcing the bent portion 12C of the rear side member 12.

Further, a bracket for mounting the inlet pipe 40 to the vehicle was conventionally disposed at the side surface of the wheel house inner, or the like. However, if the inlet pipe 40 is mounted to the vehicle only by the bracket 50 and without providing such a bracket, the inlet pipe 40 can be protected without the number of parts increasing.

[Modified Examples of First Embodiment]

Modified examples of the first embodiment are described next by using FIG. 4A, FIG. 4B, FIG. 5A and FIG. 5B. Note that the modified examples of the first embodiment that are illustrated in FIG. 4A, FIG. 4B, FIG. 5A and FIG. 5B are structured substantially similarly to the first embodiment except for the following points. Accordingly, structural portions that are substantially similar to those of the first embodiment are denoted by the same reference numerals, and description thereof is omitted.

Figure 4A:
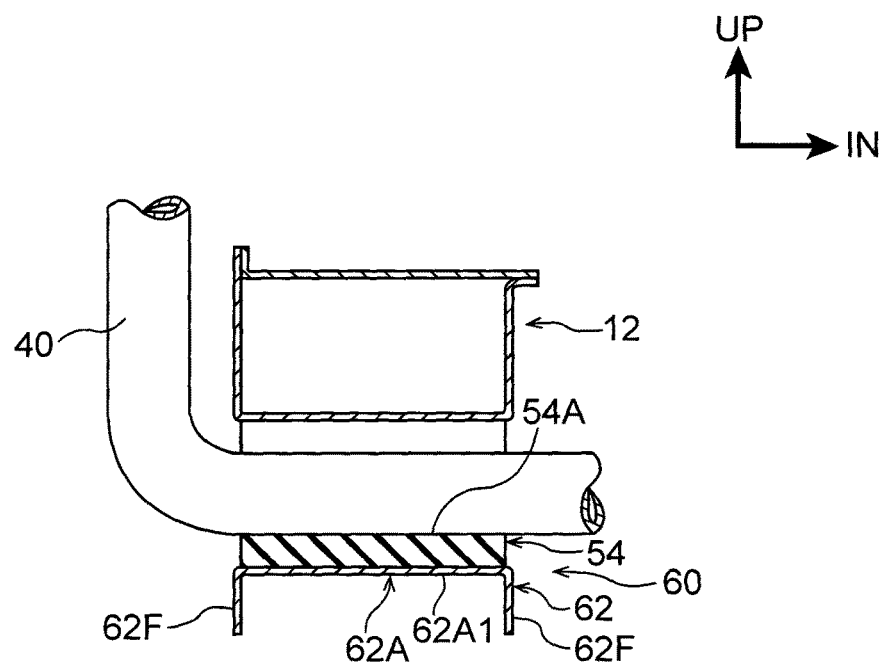
FIG. 4A is a vertical sectional view seen from a vehicle front surface and showing a first modified example of the first embodiment of the present invention.

A first modified example of the first embodiment is shown in FIG. 4A in a vertical sectional view seen from the vehicle front surface (a view corresponding to a cross-sectional view along line A-A of FIG. 2). As shown in FIG. 4A, in this modified example, a bracket 60 serving as a pipe protecting portion is provided instead of the bracket 50 (see FIG. 1 and the like) of the first embodiment. Note that, except for the points that are described hereinafter, the bracket 60 is structured similarly to the bracket 50 (see FIG. 1) of the first embodiment, and a plate member 62 is structured similarly to the plate member 52 (see FIG. 1) of the first embodiment, and an L-shaped portion 62A is structured similarly to the L-shaped portion 52A (see FIG. 1) of the first embodiment.

Flanges 62F are formed at the both end portions in the vehicle transverse direction at the plate member 62, that is made of metal, of the bracket 60. The flanges 62F are bent and extend, from the both end portions in the vehicle transverse direction at a general portion 62A1 of the L-shaped portion 62A, toward the side opposite the holding member 54 side.

In accordance with such a structure, operation and effects that are similar to those of the first embodiment are obtained, and in addition, the strength and rigidity of the bracket 60 with respect to load from the vehicle lower side can be improved. Further, because the flanges 62F are bent toward the side opposite the holding member side 54, even if the bracket 60 is displaced toward the vehicle upper side, the projecting end portions of the flanges 62F do not hit the inlet pipe 40.

Figure 4B:
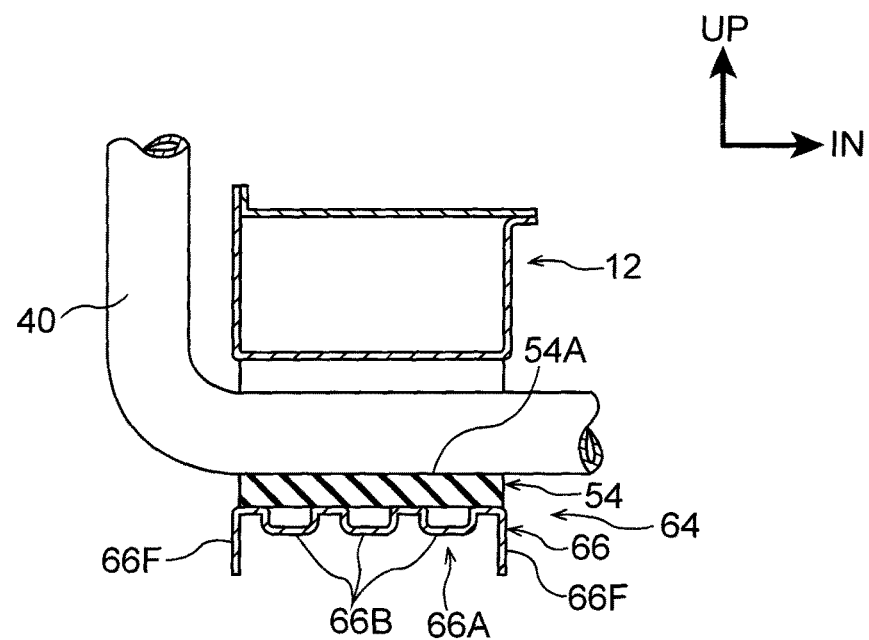
FIG. 4B is a vertical sectional view seen from the vehicle front surface and showing a second modified example of the first embodiment of the present invention.

A second modified example of the first embodiment is shown in FIG. 4B in a vertical sectional view seen from the vehicle front surface (a view corresponding to a cross-sectional view along line A-A of FIG. 2). As shown in FIG. 4B, in this modified example, a bracket 64 serving as a pipe protecting portion is provided instead of the bracket 50 (see FIG. 1 and the like) of the first embodiment. Note that, except for the points that are described hereinafter, the bracket 64 is structured similarly to the bracket 50 (see FIG. 1) of the first embodiment, and a plate member 66 is structured similarly to the plate member 52 (see FIG. 1) of the first embodiment, and an L-shaped portion 66A is structured similarly to the L-shaped portion 52A (see FIG. 1) of the first embodiment.

At the plate member 66, that is made of metal, of the bracket 64, the L-shaped portion 66A is formed in the shape of a rectangular wave-shaped plate at which the wavelength direction is the vehicle transverse direction. More concretely, plural beads 66B, that project-out toward the side opposite the holding member 54 side, are formed at the L-shaped portion 66A, and these beads 66B extend in the vehicle longitudinal direction as seen in a vehicle plan view. Further, flanges 66F, that are bent toward the side opposite the holding member 54 side, are formed at the both end portions in the vehicle transverse direction of the L-shaped portion 66A.

In accordance with such a structure, operation and effects that are similar to those of the first embodiment are obtained, and in addition, the strength and rigidity of the bracket 64 with respect to load from the vehicle lower side can be improved more. Further, in the same way as the first modified example, because the flanges 66F are bent toward the side opposite the holding member 54 side, even if the bracket 64 is displaced toward the vehicle upper side, the projecting end portions of the flanges 66F do not hit the inlet pipe 40.

Figure 5A:
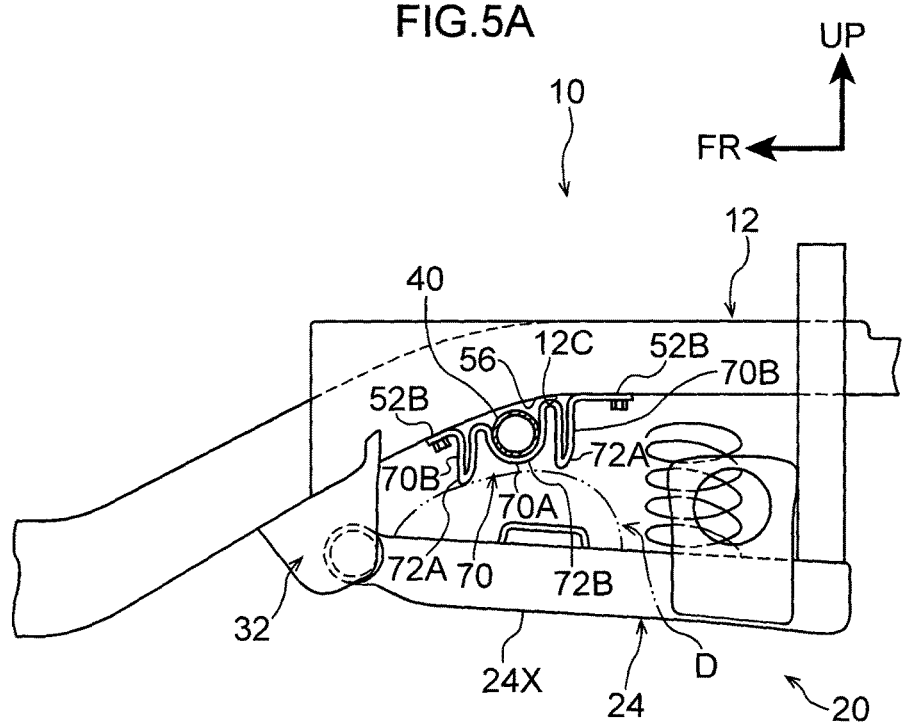
FIG. 5A is a side view showing a third modified example of the first embodiment of the present invention.

A third modified example of the first embodiment is shown in FIG. 5A in a side view (a view corresponding to FIG. 3). As shown in FIG. 5A, a bracket 70 serving as a pipe protecting portion is structured by a plate member that is made of metal, and is structured similarly to the plate member 52 (see FIG. 1 and the like) of the bracket 50 of the first embodiment except for the shape of the intermediate portion in the vehicle longitudinal direction. The intermediate portion in the vehicle longitudinal direction of the bracket 70 has, at the vehicle longitudinal direction central portion thereof, a U-shaped portion 70A that opens in a U-shape toward the vehicle upper side, and has, at the vehicle front side and the vehicle rear side of the U-shaped portion 70A, folded-back portions 70B that open toward the vehicle upper side and are folded back in bent shapes. The end portions at the vehicle lower sides of the folded-back portions 70B are disposed further toward the vehicle lower side than the end portion at the vehicle lower side of the U-shaped portion 70A. Due thereto, convex portions 72A, that are shaped as projections and are bent toward the vehicle lower side, are formed at the bracket 70 at the end portion at the vehicle lower side. In other words, the convex portions 72A are structured by the vehicle lower side end portions of the folded-back portions 70B.

The flange portions 52B of the bracket 70 straddle the bent portion 12C of the rear side member 12 and are fastened and fixed by bolts to the bottom surface side of the rear side member 12. Further, the lower portion of the U-shaped portion 70A structures a covering portion 72B that covers the inlet pipe 40 from the vehicle lower side (the side of the overlap portion 24X of the trailing arm 24). Further, the inlet pipe 40 is inserted-through at the inner surface side of the U-shaped portion 70A. The rigidity, with respect to load from the vehicle lower side, of the bracket 70 that is structured in this way is set to be higher than that of the inlet pipe 40.

In accordance with such a structure, in addition to the operation and effects of the first embodiment, for example, in a case in which the overlap portion 24X is displaced toward the vehicle upper side in a state in which the foreign matter D has collected on the top surface of the overlap portion 24X of the trailing arm 24, the foreign matter D hits the convex portions 72A at positions lower than the inlet pipe 40, and is broken. Due to the foreign matter D being broken and eliminated in this way, the frequency of input of load to the bracket 70 is reduced, and input of load to the inlet pipe 40 can be suppressed.

Figure 5B:
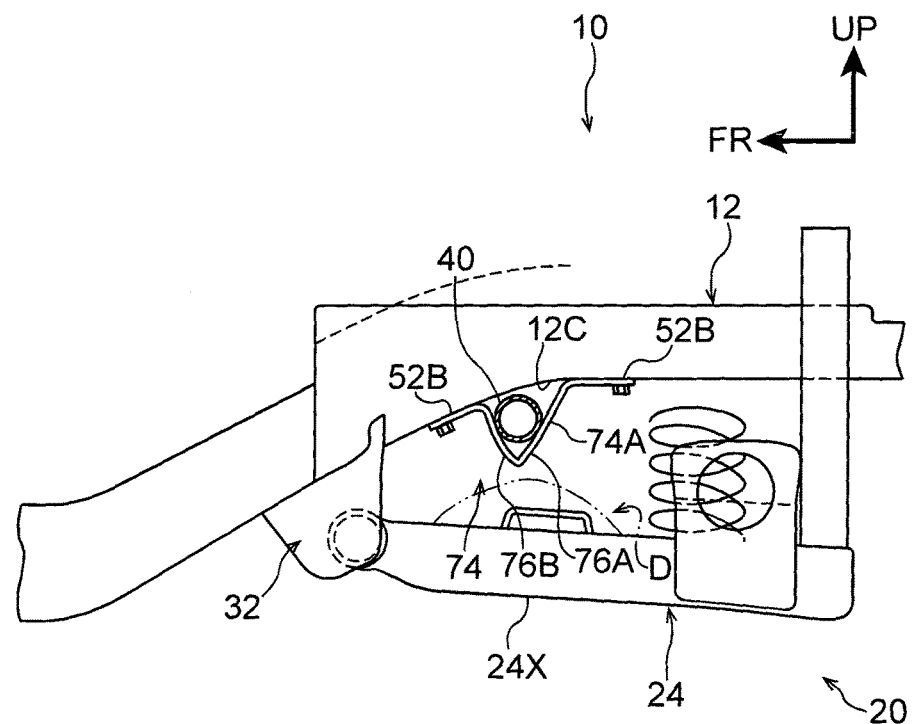
FIG. 5B is a side view showing a fourth modified example of the first embodiment of the present invention.

A fourth modified example of the first embodiment is shown in FIG. 5B in a side view (a view corresponding to FIG. 3). As shown in FIG. 5B, a bracket 74 serving as a pipe protecting portion is structured by a plate member that is made of metal, and is structured similarly to the plate member 52 (see FIG. 1 and the like) of the bracket 50 of the first embodiment except for the shape of the intermediate portion in the vehicle longitudinal direction. The intermediate portion in the vehicle longitudinal direction of the bracket 74 is made to be a V-shaped portion 74A that is bent in a V-shape so as to open toward the vehicle obliquely upper front side. Due thereto, a convex portion 76A, that is shaped as a projection and is bent toward the vehicle lower side, is formed at the bracket 74 at the end portion at the vehicle lower side. In other words, the convex portion 76A is structured by the vehicle lower side end portion of V-shaped portion 74A.

The flange portions 52B of the bracket 74 straddle the bent portion 12C of the rear side member 12 and are fastened and fixed by bolts to the bottom surface side of the rear side member 12. Further, the lower portion of the V-shaped portion 74A structures a covering portion 76B that covers the inlet pipe 40 from the vehicle lower side (the side of the overlap portion 24X of the trailing arm 24). Further, the inlet pipe 40 is inserted-through at the inner surface side of the V-shaped portion 74A. The rigidity, with respect to load from the vehicle lower side, of the bracket 74 that is structured in this way is set to be higher than that of the inlet pipe 40.

In accordance with such a structure, in addition to the operation and effects of the first embodiment, for example, in a case in which the overlap portion 24X is displaced toward the vehicle upper side in a state in which the foreign matter D has collected on the top surface of the overlap portion 24X of the trailing arm 24, the foreign matter D hits the convex portion 76A at a position lower than the inlet pipe 40, and is broken and eliminated. Namely, operation and effects that are similar to those of the third modified example (see FIG. 5A) of the first embodiment can be obtained.

Second Embodiment

A vehicle rear portion structure relating to a second embodiment of the present invention is described next by using FIG. 6 and FIG. 7. Note that structural portions that are substantially similar to those of the first embodiment are denoted by the same reference numerals, and description thereof is omitted.

Figure 6:
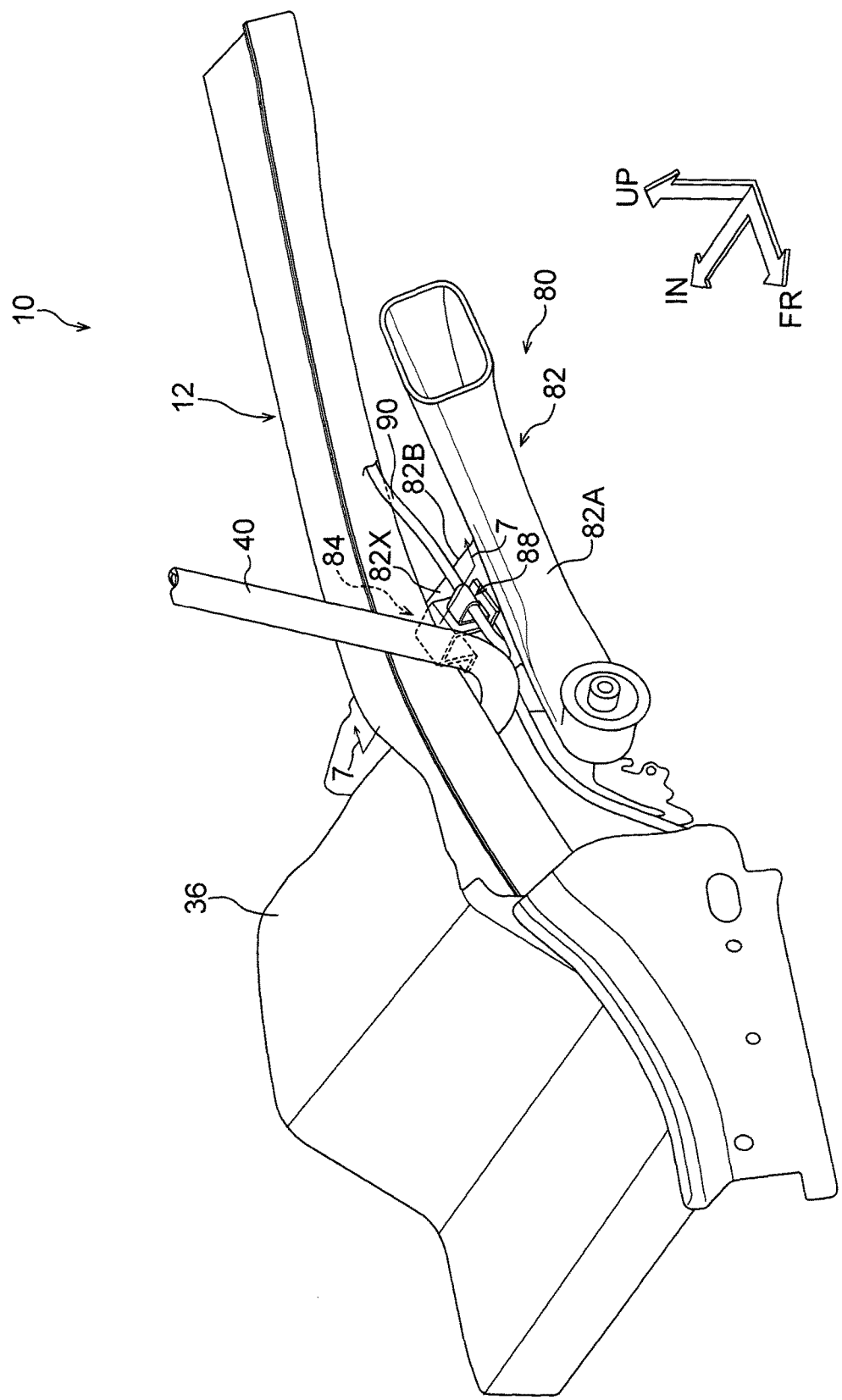
FIG. 6 is a perspective view showing a state in which a vehicle rear portion structure relating to a second embodiment of the present invention is viewed from a vehicle obliquely upper side.

The vehicle rear portion structure relating to the present embodiment is shown in FIG. 6 is a perspective view in a state of being viewed from the vehicle obliquely upper side. Further, an enlarged sectional view along line 7-7 of FIG. 6 is shown in FIG. 7. As shown in FIG. 6, a rear suspension member 82 that structures a portion of a rear suspension 80 is disposed at a position that includes the lower side of the vehicle longitudinal direction intermediate portion of the rear side member 12. The rear suspension member 82 has trailing arms (suspension arms) 82A and an intermediate beam 82B. The trailing arms 82A are provided at both sides in the vehicle transverse direction of the rear suspension member 82, and the substantially vehicle longitudinal direction is the length directions thereof, and more concretely, the trailing arms 82A are disposed so as to be inclined slightly toward the vehicle transverse direction outer side while heading toward the vehicle rear side. Further, the intermediate beam 82B is disposed with the vehicle transverse direction being the length direction thereof, and connects the length direction intermediate portions of the pair of left and right trailing arms 82A.

The rear suspension member 82 has, at the front portions of the trailing arms 82A and at regions at the vehicle transverse direction outer sides of the intermediate beam 82B, overlap portions 82X that serve as suspension structural portions and that overlap the rear side members 12 as seen in a vehicle plan view. The overlap portion 82X is disposed at the vehicle lower side of the rear side member 12 with a gap therebetween. Further, the inlet pipe 40 passes-through between the rear side member 12 and the overlap portion 82X at the rear suspension member 82 (the front portion of the trailing arm 82A).

A bracket 84 serving as a pipe protecting portion is provided at a position that overlaps the rear side member 12 and the overlap portion 82X at the rear suspension member 82 (more concretely, a region at the vehicle transverse direction outer side of the intermediate beam 82B) as seen in a vehicle plan view. As shown in FIG. 6 and FIG. 7, the bracket 84 is disposed between the rear side member 12 and the overlap portion 82X at the rear suspension member 82, and is structured to include a region that is adjacent to the side (the vehicle rear side) of the inlet pipe 40.

The bracket 84 is structured by a plate member made of metal, and is formed in a hat shape as seen in a vehicle rear view. As shown in FIG. 7, at the bracket 84, flange portions 84A are fixed to the top surface of the intermediate beam 82B by welding or the like. Further, the bracket 84, together with the overlap portion 82X at the rear suspension member 82 (the intermediate beam 82B), structures a closed cross-section portion 86. Further, the length in the vehicle vertical direction of the bracket 84 is set to be longer than the outer diameter of the inlet pipe 40. The rigidity, with respect to load from the vehicle lower side, of the bracket 84 that is structured in this way is set to be higher than that of the inlet pipe 40.

A mounting wall portion 88A of a holding member 88 that is plate-shaped is fastened by bolts to a side wall portion 84B at the vehicle transverse direction outer side of the bracket 84. The holding member 88 has a top wall portion 88B that is bent and extends from the upper end of the mounting wall portion 88A substantially toward the vehicle transverse direction outer side, and a curved portion 88C that is bent in a substantial C-shape from the vehicle transverse direction outer side end portion of the top wall portion 88B. A PKB cable 90 is inserted-through the inner side of the curved portion 88C. Note that, instead of the PKB cable 90, a brake tube or an ABS wire harness or the like (not illustrated) may be inserted-through the inner side of the curved portion 88C.

(Operation/Effects)

Operation and effects of the above-described embodiment are described next.

Figure 7:
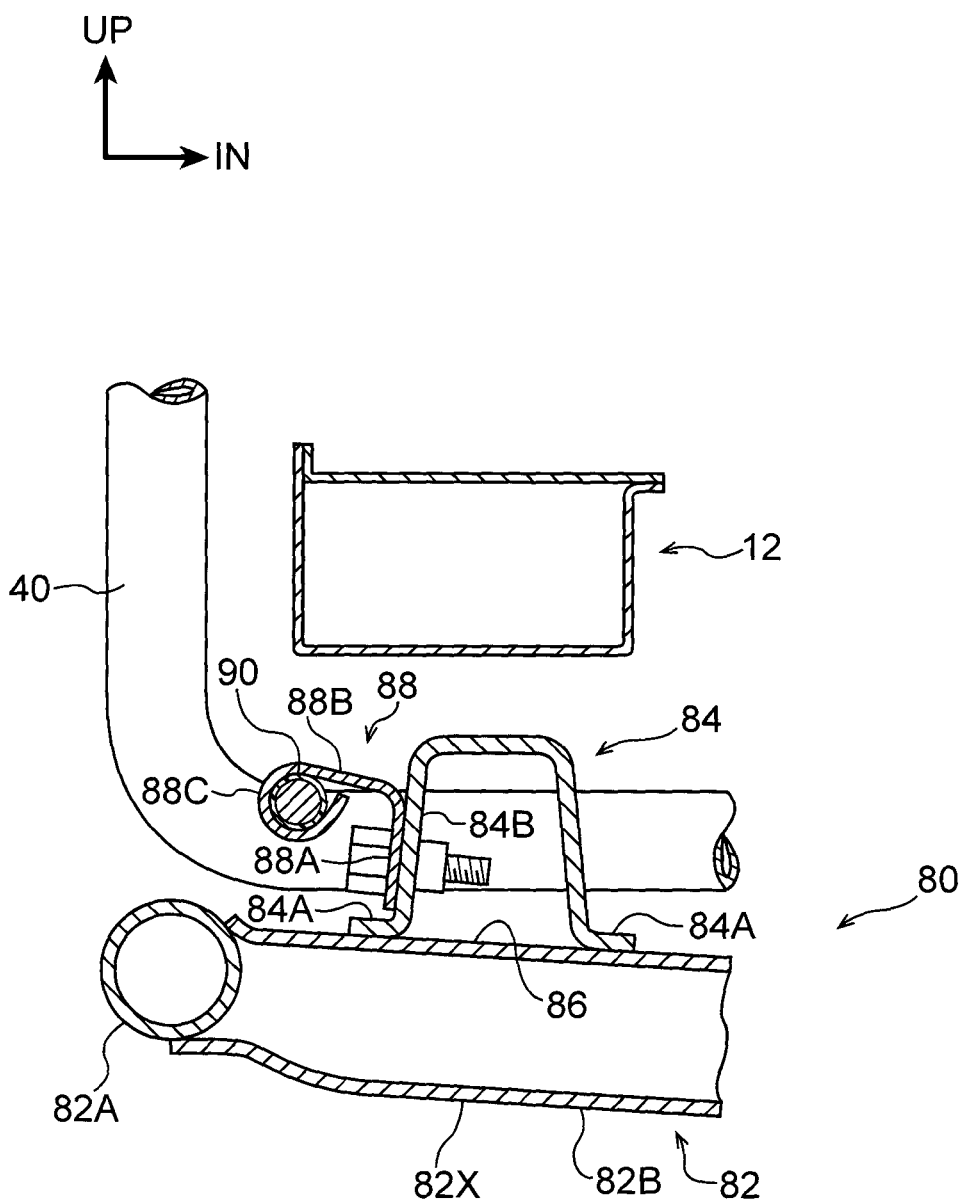
FIG. 7 is an enlarged sectional view along line 7-7 of FIG. 6.

As shown in FIG. 6 and FIG. 7, the inlet pipe 40 passes-through between the rear side member 12 and the overlap portion 82X at the rear suspension member 82, and, as seen in a vehicle plan view, the bracket 84 is provided at a position overlapping the rear side member 12 and the overlap portion 82X at the rear suspension member 82. This bracket 84 is structured to include a region that is adjacent to the side of the inlet pipe 40. Therefore, even if the overlap portion 82X at the rear suspension member 82 is displaced toward the vehicle upper side, the gap between the bottom surface of the rear side member 12 and the top surface of the overlap portion 82X at the rear suspension member 82, that are disposed above and below the inlet pipe 40, is ensured by the bracket 84.

Here, as shown in FIG. 7, the length in the vehicle vertical direction of the bracket 84 is set to be longer than the outer diameter of the inlet pipe 40, and the rigidity, with respect to load from the vehicle lower side, of the bracket 84 is set to be higher than that of the inlet pipe 40. Therefore, even if the overlap portion 82X at the rear suspension member 82 is displaced toward the vehicle upper side as described above, when the bracket 84 does not deform (or hardly deforms at all), the gap between the bottom surface of the rear side member 12 and the top surface of the overlap portion 82X at the rear suspension member 82, that are disposed above and below the inlet pipe 40, is maintained longer than the outer diameter of the inlet pipe 40.

Further, in the present embodiment, the bracket 84, together with the overlap portion 82X at the rear suspension member 82, structures the closed cross-section portion 86. Therefore, in a case in which the overlap portion 82X at the rear suspension member 82 is displaced toward the vehicle upper side, even if the bracket 84 and the rear side member 12 collide, deformation in the vehicle vertical direction of the bracket 84 is suppressed effectively.

As described above, in accordance with the vehicle rear portion structure relating to the present embodiment, even in a case in which the overlap portion 82X at the rear suspension member 82 is displaced toward the vehicle upper side, input of load to the inlet pipe 40 can be suppressed.

Note that, in the present embodiment, in a case in which the overlap portion 82X at the rear suspension member 82 is displaced toward the vehicle upper side, the bracket 84 interferes with the rear side member 12 before the inlet pipe 40. Therefore, notification can be given of bounding of the rear suspension member 82 due to the abnormal sound at the time of this interference. Further, by mounting the holding member 88 to the side wall portion 84B of the bracket 84, the PKB cable 90 can be protected without increasing the number of parts.

Third Embodiment

A vehicle rear portion structure relating to a third embodiment of the present invention is described next by using FIG. 8A and FIG. 8B. The vehicle rear portion structure relating to the present embodiment is shown in FIG. 8A in a side view, and a cross-sectional view along line 8B-8B of FIG. 8A is shown in FIG. 8B. Note that the present embodiment is structured similarly to the first embodiment except for the points that are described hereinafter, and structural portions that are similar to those of the first embodiment are denoted by the same reference numerals, and description thereof is omitted.

A rear side member 92 that is shown in FIG. 8 is structured similarly to the rear side member 12 (see FIG. 1 and the like) of the first embodiment except for the points that are described hereinafter. A region of the rear side member 92, which region is at the vehicle upper side of the overlap portion 24X of the trailing arm 24, is a bulging portion 94 that bulges-out (is curved) toward the vehicle upper side. The lower wall portion (bottom surface portion) of the bulging portion 94 is a pipe protecting portion 94A that is shaped as an arch. The pipe protecting portion 94A is provided at a position overlapping the rear side member 92 and the overlap portion 24X of the trailing arm 24 in a vehicle plan view, and is structured to include a region that is adjacent to sides of the inlet pipe 40 (concretely, the vehicle front side and vehicle rear side). Namely, the pipe protecting portion 94 is disposed so as to cover the vehicle front side, the vehicle upper side and the vehicle rear side of the inlet pipe 40. Further, the length in the vehicle vertical direction of the pipe protecting portion 94A is set to be longer than the outer diameter of the inlet pipe 40, and the rigidity, with respect to load from the vehicle lower side, of the pipe protecting portion 94A is set to be higher than that of the inlet pipe 40.

In accordance with the structure of the present embodiment, even if the overlap portion 24X of the trailing, arm 24 is displaced toward the vehicle upper side, when the pipe protecting portion 94A does not deform (or hardly deforms at all), the gap between the bottom surface of the rear side member 12 (the upper portion of the pipe protecting portion 94A) and the top surface of the overlap portion 24X at the trailing arm 24, that are disposed above and below the inlet pipe 40, is maintained longer than the outer diameter of the inlet pipe 40. Namely, in accordance with the vehicle rear portion structure relating to the present embodiment, even in a case in which the overlap portion 24X of the trailing arm 24 is displaced toward the vehicle upper side, input of load to the inlet pipe 40 can be suppressed.

REFERENCE EXAMPLES

A vehicle rear portion structure relating to a reference example is described next by using FIG. 9A and FIG. 9B. The vehicle rear portion structure relating to the reference example is shown in FIG. 9A in a side view, and a cross-sectional view along line 9B-9B of FIG. 9A is shown in FIG. 9B. Note that this reference example is structured similarly to the first embodiment except for the points that are described hereinafter, and structural portions that are similar to those of the first embodiment are denoted by the same reference numerals, and description thereof is omitted.

A rear side member 100 shown in FIG. 9 is structured similarly to the rear side member 12 (see FIG. 1 and the like) of the first embodiment except for the points that are described hereinafter. A cylindrical tube portion 102 is disposed at the rear side member 100 at a region at the vehicle upper side of the overlap portion 24X of the trailing arm 24, and the vehicle transverse direction is the axial direction of this cylindrical tube portion 102. As shown in FIG. 9B, the outer peripheral surfaces of the both end portions in the axial direction of the cylindrical tube portion 102 are joined to the inner peripheral surfaces of through-holes 104A that are formed so as to pass-through a pair of left and right side wall portions 104 at the rear side member 100. The inlet pipe 40 passes-through the inner side of the cylindrical tube portion 102 in the vehicle transverse direction. In accordance with such a structure, even in a case in which the overlap portion 24X of the trailing arm 24 is displaced toward the vehicle upper side, input of load to the inlet pipe 40 can be suppressed.

Figure 10B:
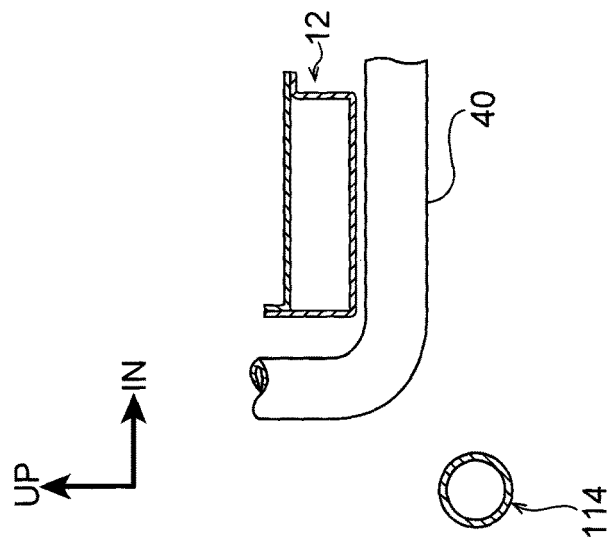
FIG. 10B is a sectional view along line 10B-10B of FIG. 10A.
Figure 10A:
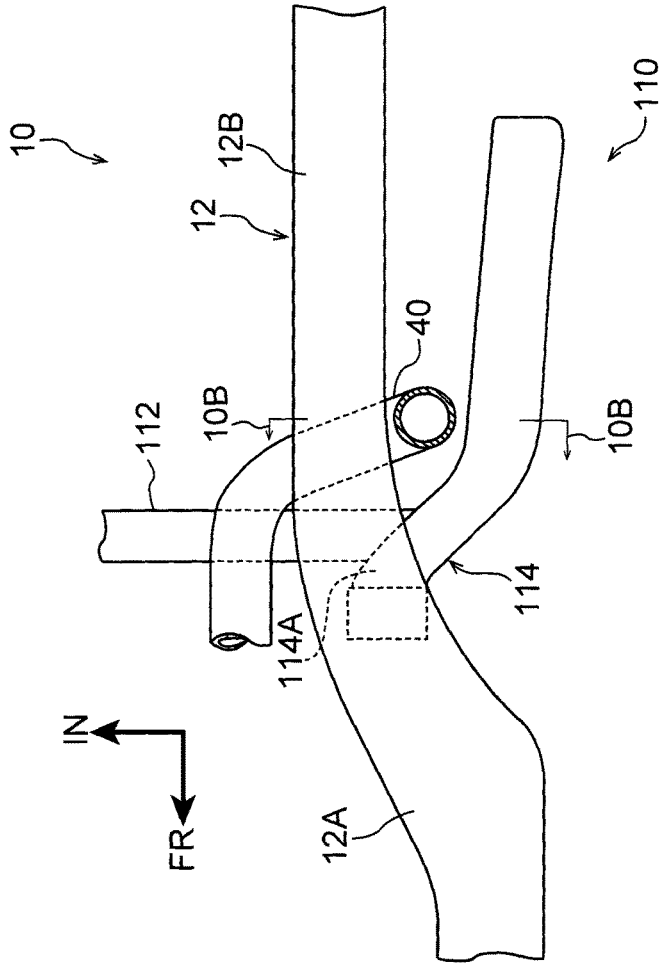
FIG. 10A is a plan view showing a vehicle rear portion structure relating to another reference example.

A vehicle rear portion structure relating to another reference example is described next by using FIG. 10A and FIG. 10B. The vehicle rear portion structure relating to the reference example is shown in FIG. 10A in a plan view, and a cross-sectional view along line 10B-10B of FIG. 10A is shown in FIG. 10B. Note that this reference example is structured similarly to the first embodiment except for the points that are described hereinafter, and structural portions that are similar to those of the first embodiment are denoted by the same reference numerals, and description thereof is omitted.

As shown in FIG. 10A, a rear suspension 110 is disposed at a position that includes the lower sides of the vehicle longitudinal direction intermediate portions of the rear side members 12. The rear suspension 110 has an intermediate beam 112 that is disposed with the length direction thereof being the vehicle transverse direction. Both end portions in the length direction of the intermediate beam 112 are disposed at the lower sides of the rear side members 12. The front end portions of trailing arms (suspension arms) 114 that structure portions of the rear suspension 110 are joined to the both end portions in the length direction of the intermediate beam 112. At the trailing arm 114, the region that overlaps the rear side member 12 in a vehicle plan view is only a front end portion 114A. Note that, in the drawings, the trailing arm 114 is illustrated in a simplified manner.

On the other hand, the inlet pipe 40, that passes by the vehicle lower side of the rear side member 12, intersects the rear side member 12 further toward the vehicle rear side than the intermediate beam 112 and the front end portion 114A of the trailing arm 114 as seen in a vehicle plan view. In other words, the inlet pipe 40 does not pass by the range where the rear side member 12 and the rear suspension 110 overlap as seen in a vehicle plan view. In accordance with such a structure, even in a case in which the rear suspension 110 is displaced toward the vehicle upper side, the inlet pipe 40 basically is not nipped between the rear side member 12 and the rear suspension 110, and therefore, input of load to the inlet pipe 40 can be suppressed.

[Supplementary Description of Embodiments]

Note that, as a modified example of the first embodiment, a bracket, that is provided at a similar position as the bracket 50 and at which only one end portion is fixed to the rear side member 12 and whose other end portion is a free end (a bracket that is fixed in a so-called cantilever supported state), may be disposed as the pipe protecting portion instead of the bracket 50 that is illustrated in FIG. 1 and the like. Further, a covering portion that covers the inlet pipe 40 from the vehicle lower side (the side of the overlap portion 24X of the trailing arm 24) may be formed at such a bracket. Further, as another modified example of the first embodiment, a bracket serving as a pipe protecting portion may be structured only by the plate member 52 that is made of metal, without providing the holding member 54 that is made of resin.

Further, as another modified example of the second embodiment, the bracket 84 that is illustrated in FIG. 6 may be disposed at an orientation such that it is hat-shaped as seen in a vehicle side view, and this bracket, together with the overlap portion 82X at the rear suspension member 82, may structure a closed cross-section portion. Further, the inlet pipe 40 may be inserted-through the interior of the hollow portion of the closed cross-section portion in such a modified example. Moreover, as another modified example of the second embodiment, the inlet pipe 40 may be inserted-through the interior of the hollow portion of the closed cross-section portion 86 shown in FIG. 7.

As another modified example of the second embodiment, a bracket, that is provided at a similar position as the bracket 84 and at which only one end portion is fixed to the intermediate beam 82B (the rear suspension member 82) and whose other end portion is a free end (a bracket that is fixed in a so-called cantilever supported state), may be disposed as the pipe protecting portion instead of the bracket 84. Further, a covering portion that covers the inlet pipe 40 from the vehicle upper side (the side of rear side member 12) may be formed at such a bracket.

Further, for example, a concave portion may be formed in the top wall portion of the suspension structural portion, and the pipe protecting portion may be structured by this concave portion. In this case, the concave portion is provided at a position that overlaps the rear side member as seen in a vehicle plan view, and is structured to include a region that is adjacent to a side of the inlet pipe, and the length of the concave portion in the vehicle vertical direction is set to be longer than the outer diameter of the inlet pipe, and the rigidity, with respect to load from the vehicle lower side, of the concave portion is set to be higher than that of the inlet pipe.

Note that the above-described embodiments and the above-described plural modified examples can be implemented by being combined appropriately.

Although examples of the present invention have been described above, the present invention is not limited to the above, and, other than the above, can be of course be implemented by being modified in various ways within a scope that does not deviate from the gist thereof.

The disclosure of Japanese Patent Application No. 2013-160639 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. A vehicle rear portion structure comprising:
   a rear side member that is disposed at a side of a vehicle rear portion, with a vehicle longitudinal direction being a length direction;
   a suspension structural portion that constitutes a portion of a rear suspension, and that is disposed at a vehicle lower side of the rear side member with a gap therebetween, and that overlaps the rear side member as seen in a vehicle plan view;
   an inlet pipe that passes between the rear side member and the suspension structural portion; and
   a pipe protecting portion that is provided at a position overlapping the rear side member and the suspension structural portion as seen in a vehicle plan view, and that includes a region adjacent to a side of the inlet pipe, wherein a length in a vehicle vertical direction of the pipe protecting portion is set to be longer than an outer diameter of the inlet pipe, and wherein a rigidity, with respect to a load from the vehicle lower side, of the pipe protecting portion is set to be greater than that of the inlet pipe;
   wherein the pipe protecting portion has a bracket that is disposed between the rear side member and the suspension structural portion, and that is fixed to one of the rear side member or the suspension structural portion, and that, together with the one to which the bracket is fixed, structures a closed cross-section portion.

2. A vehicle rear portion structure comprising:
   a rear side member that is disposed at a side of a vehicle rear portion, with a vehicle longitudinal direction being a length direction;
   a suspension structural portion that constitutes a portion of a rear suspension, and that is disposed at a vehicle lower side of the rear side member with a gap therebetween, and that overlaps the rear side member as seen in a vehicle plan view;
   an inlet pipe that passes between the rear side member and the suspension structural portion; and
   a pipe protecting portion that is provided at a position overlapping the rear side member and the suspension structural portion as seen in a vehicle plan view, and that includes a region adjacent to a side of the inlet pipe, wherein a length in a vehicle vertical direction of the pipe protecting portion is set to be longer than an outer diameter of the inlet pipe, and wherein a rigidity, with respect to a load from the vehicle lower side, of the pipe protecting portion is set to be greater than that of the inlet pipe;
   wherein:
   the pipe protecting portion has a bracket that is disposed between the rear side member and the suspension structural portion, and that is fixed to one of the rear side member or the suspension structural portion, and
   a covering portion, that covers the inlet pipe from a side of the other of the rear side member or the suspension structural portion, is formed at the bracket.

3. The vehicle rear portion structure of claim 1, wherein the inlet pipe is inserted-through an interior of a hollow portion of the closed cross-section portion.

4. The vehicle rear portion structure of claim 1, wherein the bracket is fixed to the rear side member, and a convex portion, that is bent toward the vehicle lower side, is formed at a vehicle lower side end portion of the bracket.

5. The vehicle rear portion structure of claim 1, wherein:
a bent portion, that is bent toward a vehicle obliquely lower front side, is formed at an intermediate portion in the vehicle longitudinal direction of the rear side member, and
both end portions, in the vehicle longitudinal direction of the bracket, straddle the bent portion and are fixed to the rear side member.

* * * * *